(12) United States Patent
Marques et al.

(10) Patent No.: US 11,566,537 B2
(45) Date of Patent: Jan. 31, 2023

(54) WATER-COOLED CENTRIFUGAL COMPRESSOR HOUSING ASSEMBLY, AND TURBOCHARGER INCORPORATING SAME

(71) Applicant: Garrett Transportation I Inc., Torrance, CA (US)

(72) Inventors: Manuel Marques, Richardménil (FR); Olivier Millotte, Les Forges (FR); Emeric Genin, Bayon (FR); Jean-Pierre Toniolo, Chavelot (FR)

(73) Assignee: Garrett Transportation I Inc., Torrance, CA (US)

( * ) Notice: Subject to any disclaimer, the term of this patent is extended or adjusted under 35 U.S.C. 154(b) by 60 days.

(21) Appl. No.: 16/949,045

(22) Filed: Oct. 12, 2020

(65) Prior Publication Data

US 2022/0112818 A1     Apr. 14, 2022

(51) Int. Cl.
| | |
|---|---|
| *F01D 25/14* | (2006.01) |
| *F04D 17/10* | (2006.01) |
| *F04D 29/42* | (2006.01) |
| *F04D 29/58* | (2006.01) |

(52) U.S. Cl.
CPC ............. *F01D 25/14* (2013.01); *F04D 17/10* (2013.01); *F04D 29/42* (2013.01); *F04D 29/584* (2013.01); *F05D 2210/11* (2013.01); *F05D 2220/40* (2013.01); *F05D 2230/21* (2013.01); *F05D 2260/20* (2013.01)

(58) Field of Classification Search
None
See application file for complete search history.

(56) References Cited

U.S. PATENT DOCUMENTS

| | | | |
|---|---|---|---|
| 4,676,717 A | 6/1987 | Willyard, Jr. et al. | |
| 6,193,463 B1 | 2/2001 | Adeff et al. | |
| 10,436,216 B2 * | 10/2019 | Uesugi | F04D 29/5853 |
| 2016/0273548 A1 * | 9/2016 | Uesugi | F04D 29/5853 |
| 2019/0226496 A1 * | 7/2019 | Arakawa | F04D 29/584 |

FOREIGN PATENT DOCUMENTS

DE      102009001321 A1     9/2010

* cited by examiner

*Primary Examiner* — Woody A Lee, Jr.
*Assistant Examiner* — Jason Fountain
(74) *Attorney, Agent, or Firm* — John C. James

(57) ABSTRACT

A water-cooled compressor housing assembly for a turbocharger includes a compressor housing that defines an open-ended cavity extending axially downstream into the compressor housing, and a separately formed cover that is affixed to the compressor housing so as to close the open end of the cavity and thereby define a coolant passage for a liquid coolant to be circulated through. A coolant inlet and a coolant outlet are provided for supplying coolant into and exhausting coolant from the coolant passage. The compressor housing has a simplified geometry that is manufacturable by sand casting without needed a sand core for the coolant passage, or by die casting.

9 Claims, 10 Drawing Sheets

WATER-COOLED CENTRIFUGAL COMPRESSOR HOUSING ASSEMBLY, AND TURBOCHARGER INCORPORATING SAME

BACKGROUND OF THE INVENTION

This application relates generally to turbochargers for internal combustion engines, and relates more specifically to compressor housing assemblies for turbochargers. In particular, this application relates to compressor housings that include a coolant passage for circulation of a liquid coolant through the housing to cool it.

An exhaust gas-driven turbocharger is a device used in conjunction with an internal combustion engine for increasing the power output of the engine by compressing the air that is delivered to the engine's air intake to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is a center housing connected between the turbine and compressor housings for containing bearings for the shaft. The turbine housing defines a generally annular chamber that surrounds the turbine wheel and that receives exhaust gas from the engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

The compressor can compress the air to a level as much as four (or more) times the ambient pressure. As regulatory bodies impose more and more stringent limits on emissions from internal combustion engines, turbochargers are increasingly being required to operate at higher and higher compressor pressure ratios. As a result, the temperature of the air discharged from the turbocharger compressor is being pushed higher and higher, and correspondingly the temperature of the compressor housing is being pushed to higher and higher levels. Therefore, there is an increasing need for cooling the compressor housing, typically by providing a coolant passage within the compressor housing for circulating engine coolant through the compressor housing.

Conventionally, compressor housings are formed by sand-casting. Providing a coolant passage in the compressor housing requires the use of a sand core within the sand mold to create the passage. The necessary geometries of the coolant passage are tending to become more and more complex as packaging constraints on turbochargers grow more stringent and cooling efficiency targets creep higher and higher. This can cause difficulties in shooting the sand into the mold box so that the sand fully fills all the spaces.

There is therefore a need in the art for solutions to the problem of forming water-cooled compressor housings that can meet the packaging constraints and cooling efficiency targets that are desired.

SUMMARY OF THE DISCLOSURE

The present disclosure describes embodiments of a turbocharger having a compressor housing assembly that includes a liquid coolant passage and that is readily manufacturable by sand casting or die casting techniques, without requiring the use of a coolant passage core. In one embodiment, the turbocharger comprises a compressor housing assembly, a compressor wheel disposed within the compressor housing assembly, a turbine housing and a turbine wheel disposed within the turbine housing, a rotatable shaft, the compressor wheel being affixed to one end of the shaft and the turbine wheel being affixed to an opposite end of the shaft, and a center housing disposed between the compressor housing and the turbine housing, wherein bearings supporting the shaft are housed within the center housing.

The liquid-cooled compressor housing assembly comprises a compressor housing comprising a wheel shroud that defines a contour, a diffuser-defining wall joined integrally with the wheel shroud and extending radially outwardly therefrom, and a radially outer wall joined integrally with a radially outermost extent of the diffuser-defining wall, the radially outer wall defining a volute contiguous with the diffuser-defining wall. The wheel shroud, the diffuser-defining wall, and the radially outer wall collectively bound an open-ended cavity that extends into the compressor housing along an axially downstream direction, an upstream end of the cavity being open.

The compressor housing assembly includes a cover formed as a separate structure from the compressor housing, the cover being affixed to the compressor housing by one or more fastening devices such that the cover closes the open upstream end of the cavity, whereby a coolant passage is defined between and bounded by the cover and the cavity in the compressor housing.

In some embodiments of the invention, the coolant passage is bounded in part by an axially upstream surface of the diffuser-defining wall, whereby when coolant is circulated through the coolant passage, the diffuser-defining wall is wetted and cooled by the coolant.

In one embodiment, the cover comprises a tubular inlet-defining wall and an annular flange extending radially outwardly from a downstream end of the inlet-defining wall, the flange closing the upstream end of the cavity, the inlet-defining wall being structured and arranged to mate with the wheel shroud of the compressor housing.

In another embodiment, the coolant passage is bounded in part by a radially inner surface of the radially outer wall of the compressor housing. The cover includes a peripheral wall encircling a longitudinal axis of the compressor housing assembly, a downstream end of the peripheral wall being received into the cavity in the compressor housing. The coolant passage is bounded in part by a radially outer surface of the peripheral wall, and the peripheral wall defines a radially inner surface comprising an air-guiding surface in use. Seals are disposed between respective surfaces of the compressor housing and the cover to seal the coolant passage. A coolant inlet and a coolant outlet each extend from an outer surface of the compressor housing assembly into the coolant passage for circulation of a liquid coolant through the coolant inlet into the coolant passage and then from the coolant passage out through the coolant outlet.

In a ported-shroud embodiment of the invention, the cover includes an integrally joined air inlet wall that is spaced radially inwardly from the peripheral wall of the cover, the air inlet wall comprising a radially outer surface that is spaced radially inwardly from the radially inner air-guiding surface of the peripheral wall of the cover so as to define a recirculation passage therebetween. A bleed port is defined between an upstream end of the wheel shroud and a downstream end of the air inlet wall, the bleed port extending into the recirculation passage.

The assembly can further comprise a flow-guiding member affixed within the cover, the flow-guiding member comprising an annular member that extends from the peripheral wall of the cover radially inwardly and axially downstream to a trailing edge of the flow-guiding member, the trailing edge of the flow-guiding member being proximate to but spaced from a leading edge of the wheel shroud, such that a gap is defined between the trailing edge of the flow-guiding member and the leading edge of the wheel shroud. Recirculated air is injected through the gap back into the main flow passing through the air inlet.

The coolant passage can have various configurations in accordance with the present disclosure. In one embodiment, a dividing wall is provided within the coolant passage to split the coolant passage such that the coolant passage extends circumferentially about the longitudinal axis through an angle less than 360°, and the coolant inlet and the coolant outlet are circumferentially adjacent each other and located on circumferentially opposite sides of the dividing wall.

In an alternative embodiment, the coolant passage extends circumferentially 360° about the longitudinal axis, and the coolant inlet and the coolant outlet are located on diametrically opposite sides of the longitudinal axis.

In some embodiments, the cover defines the coolant inlet and the coolant outlet.

In some embodiments, the compressor housing defines the coolant inlet and the coolant outlet.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
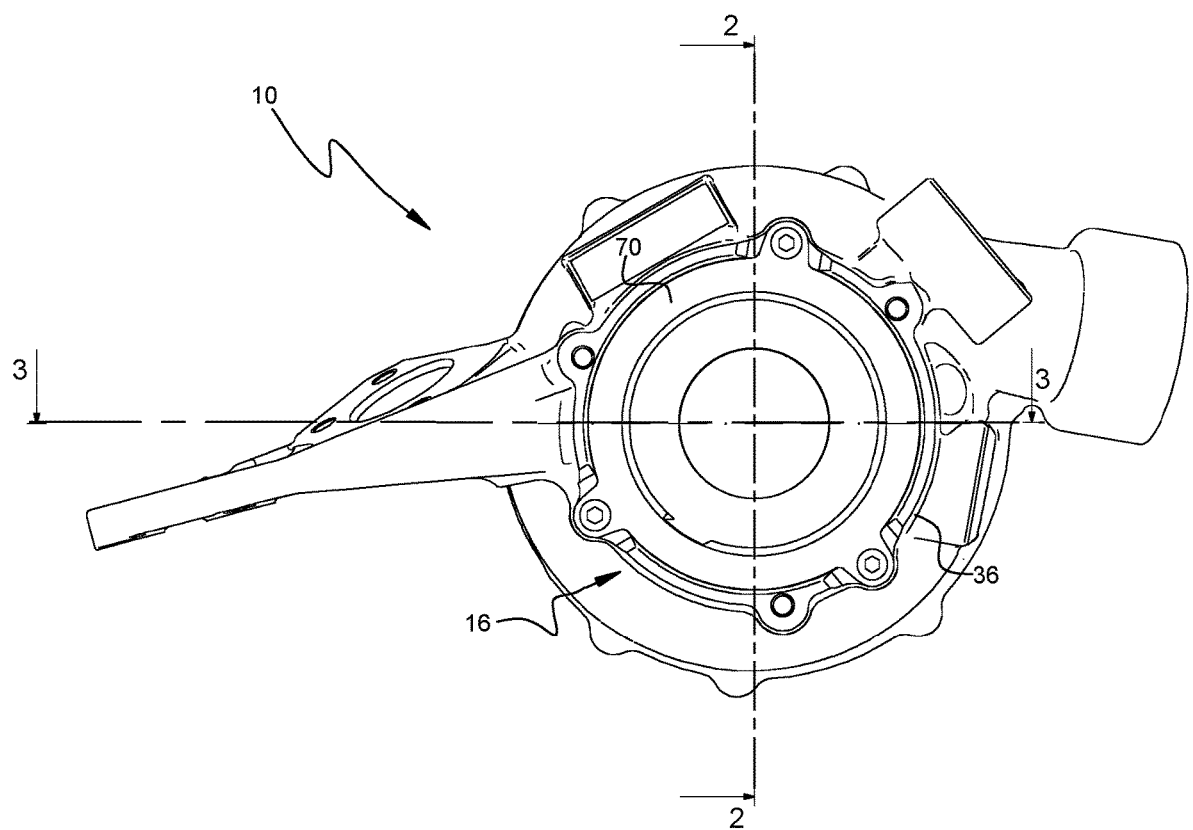
FIG. 1 depicts a turbocharger having a ported-shroud compressor housing assembly in accordance with one embodiment of the invention, viewed along the rotational axis of the turbocharger.
Figure 2:
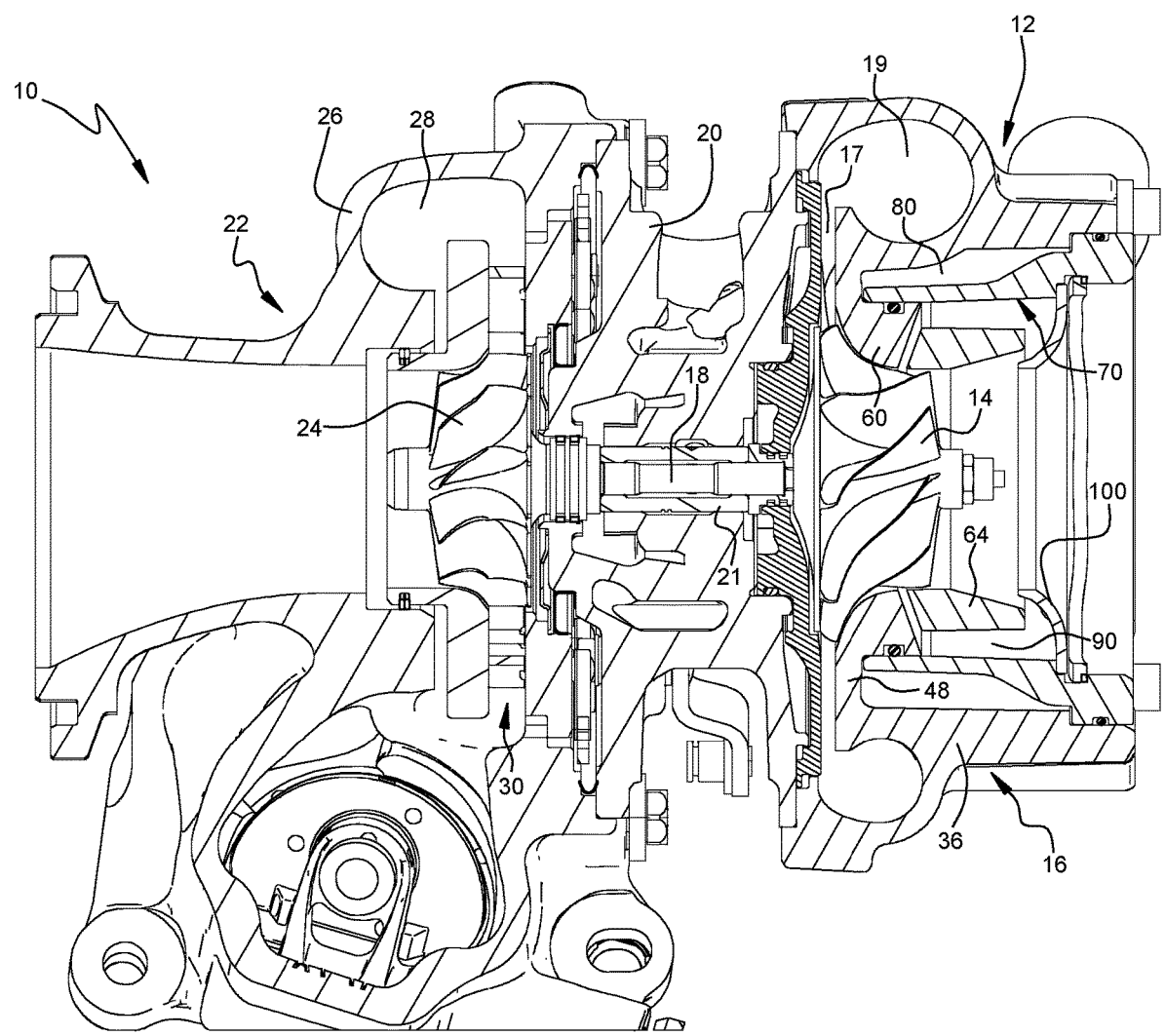
FIG. 2 is a cross-sectional view along line 2-2 of FIG. 1.

FIGS. 1 and 2 illustrate a turbocharger 10 that incorporates a compressor housing assembly in accordance with one embodiment of the invention. The turbocharger includes a compressor 12 comprising a centrifugal compressor wheel 14 mounted within a compressor housing assembly 16. The compressor wheel is affixed to one end of a rotatable shaft 18. A center housing 20 is fastened to the downstream side of the compressor housing assembly. Bearings 21 for the shaft 18 are housed within the center housing. The turbocharger further comprises a turbine 22 having a turbine wheel 24 mounted within a turbine housing 26 that is fastened to the opposite side of the center housing from the compressor. The turbine wheel is affixed to the opposite end of the shaft 18. The turbine housing defines an annular chamber 28 for receiving exhaust gases from an internal combustion engine via an inlet into the chamber 28. A turbine nozzle 30 directs exhaust gases from the chamber radially inwardly onto the turbine wheel 24, which is thereby rotatably driven as the wheel expands the exhaust gases passing through it, and the turbine wheel rotates the compressor wheel 14. Air axially entering the compressor wheel via the compressor inlet is pressurized by the wheel and is discharged radially outwardly from the exducer of the wheel, passing through a diffuser 17 into a volute 19 defined in the compressor housing assembly 16. Pressurized air from the volute is supplied to an intake manifold of the internal combustion engine.

Figure 3:
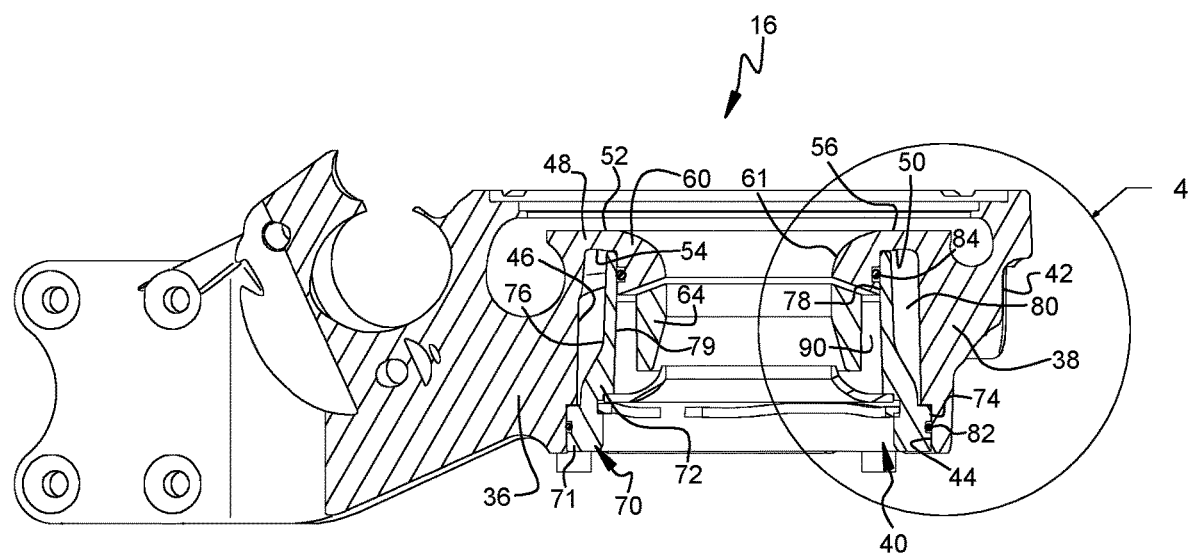
FIG. 3 is a cross-sectional view along line 3-3 of FIG. 1, but showing only the compressor housing assembly of the turbocharger.
Figure 4:
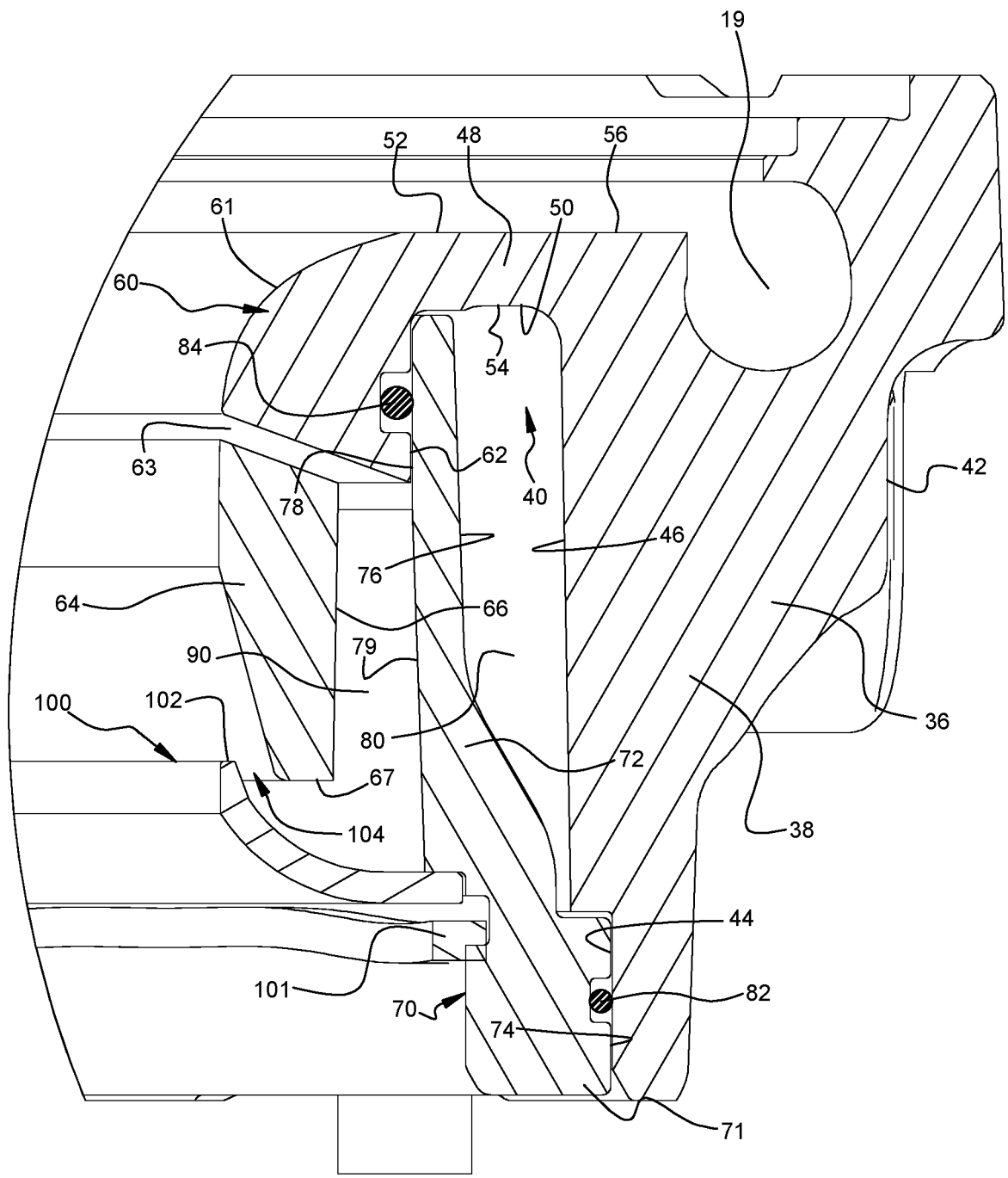
FIG. 4 is a magnified view of a portion of the compressor housing assembly of FIG. 3.
Figure 5:
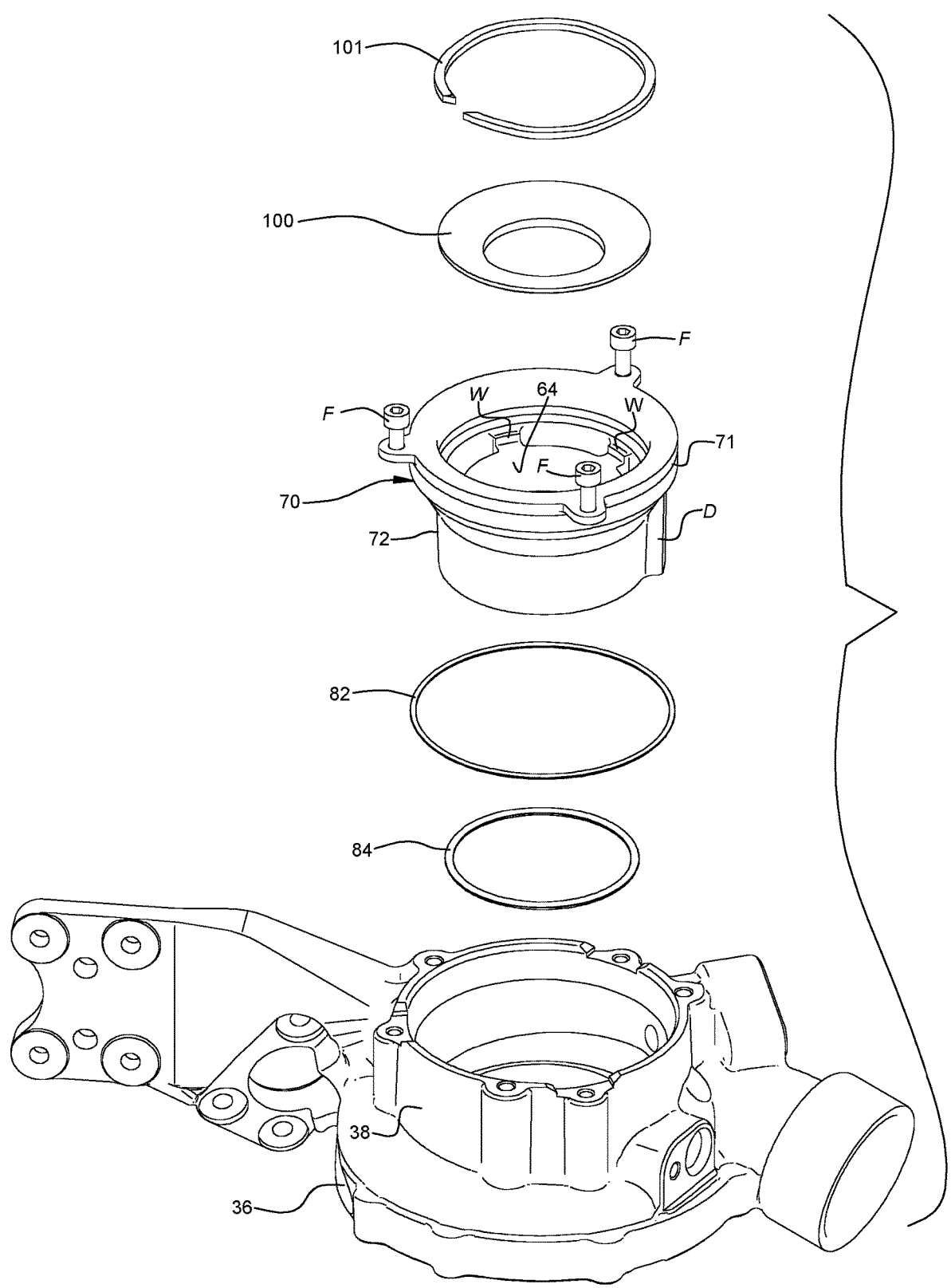
FIG. 5 is an exploded view of the compressor housing assembly of FIG. 3.

FIGS. 3-5 illustrate the compressor housing assembly 16 in isolation. The compressor housing assembly includes a compressor housing 36 comprising a radially outer wall 38 that encircles a central longitudinal axis of the compressor housing assembly. The radially outer wall 38 defines a radially outer surface 42 that encircles the longitudinal axis and extends axially from an upstream end (the lower end in FIGS. 3 and 4) of the compressor housing toward a downstream end (the upper end in FIGS. 3 and 4) of the compressor housing. The radially outer wall also defines a radially inner surface 44 a portion of which comprises a cavity-forming wall 46.

The compressor housing 36 further comprises a diffuser-defining wall 48 integrally joined with the radially outer wall 38 at a location proximate the downstream end thereof, the diffuser-defining wall extending radially inwardly from the radially outer wall and defining an axially upstream surface 50 and an axially downstream surface 52. The axially upstream surface comprises another cavity-forming wall 54 and the axially downstream surface comprises a diffuser-defining surface 56. The radially outer wall of the compressor housing also defines a volute 19 contiguous with the diffuser-defining wall 48. The compressor housing 36 further comprises a wheel shroud 60 integrally joined with a radially inner end of the diffuser-defining wall 48 and extending radially inwardly and axially upstream therefrom. The wheel shroud comprises a radially inner surface that defines a contour 61 positioned to be disposed adjacent an outer periphery of the compressor wheel when the compressor wheel is housed within the compressor housing. A radially outer surface 62 of the wheel shroud comprises another cavity-forming wall.

The cavity-forming walls 46, 54, and 62 collectively form an open-ended cavity 40 in the compressor housing 36. The cavity 40 extends into the compressor housing in a downstream axial direction, and an upstream end of the cavity is open.

The compressor housing assembly 16 further includes a cover 70 formed separately from and non-integrally with the compressor housing 36. The cover comprises a peripheral wall 72 that encircles the longitudinal axis of the compressor and defines a radially outer surface 74. A radially inner surface 78 of the peripheral wall defines an air-guiding surface 79 during operation of the compressor. The cover 70 is affixed to the compressor housing such that a downstream portion of the peripheral wall 72 is received within the open-ended cavity 40 in the compressor housing 36, and such that the cover closes the open end of the cavity. The cavity-forming wall 46 of the outer wall 38 and the cavity-forming wall 54 of the diffuser-defining wall 48 cooperate with a radially outer surface 76 of the peripheral wall 72 of the cover to form a coolant passage 80 therebetween. An upstream end of the cover defines a radially outwardly extending annular flange 71 that fits within a counterbore formed at the upstream end of the compressor housing 36, and fasteners F (FIG. 5) affix the cover to the compressor housing to retain the cover in place. In FIG. 5 the fasteners are shown as bolts or machine screws, but other fastening devices or techniques may be used instead (e.g., circlips, press fitting, etc.).

Seals 82 and 84 are disposed between respective surfaces of the compressor housing 36 and the cover 70 to seal the coolant passage 80. As shown in FIGS. 3-4, the seal 82 comprises a seal ring disposed between the radially inner surface 44 of the radially outer wall 38 of the compressor housing 36 (within the counterbore for the cover flange 71) and the radially outer surface 74 of the cover flange 71. In the illustrated embodiment, the seal 84 comprises a seal ring disposed between the radially outer surface 62 of the wheel shroud and the radially inner surface 78 of the peripheral wall 72 of the cover 70. The invention is not limited to these particular types and arrangements of seals, however, and other seal types and/or arrangements can be employed instead. For example, while both of the seals 82 and 84 are radial seals (i.e., disposed between two radially facing and opposing surfaces), one or both of the seals can be axial seals (i.e., disposed between two axially facing and opposing surfaces). Gasket sealing can also be employed instead of seal rings. Other types of seals known in the art can also be used.

With reference to FIG. 4, in the first embodiment of the invention, the cover 70 includes an integrally joined air inlet wall 64 that is spaced radially inwardly from the peripheral wall 72. The air inlet wall 64 is joined to the peripheral wall 72 by a plurality of circumferentially spaced webs W (FIG. 5) extending therebetween. The air inlet wall comprises a radially outer surface 66 that is spaced radially inwardly from the radially inner air-guiding surface 79 of the peripheral wall of the cover so as to define a recirculation passage 90 between the air inlet wall and the peripheral wall of the cover. A downstream end of the air inlet wall 64 is axially spaced from an upstream end of the wheel shroud 60 so as to define a bleed port 63 therebetween, leading into the recirculation passage 90. In operation, at some operating conditions, partially pressurized air is bled off from the main flow passage of the compressor wheel 14 through the bleed port 63 into the recirculation passage 90, and the bleed portion of the air proceeds axially upstream along the bleed passage and is injected back into the inlet of the compressor. Thus, in the first embodiment, the ported shroud is integrated into the cover. Alternatively, in a non-illustrated embodiment similar to the first embodiment, the air inlet wall and the bleed port can be integral features of the compressor housing, and the cover can be configured to direct the recirculated air into the air inlet via an injection slot or port bounded between the cover and the air inlet wall.

In the first embodiment of the invention depicted in FIGS. 1-5, injection of the bleed portion of the air is facilitated by a flow-guiding member 100 mounted within the cover 70, and retained in place by a retainer such as a snap ring 101 or other suitable device. The flow-guiding member comprises an annular member that extends from the peripheral wall 72 of the cover radially inwardly and axially downstream to a trailing edge 102 of the flow-guiding member. The trailing edge 102 of the flow-guiding member is proximate to but spaced from a leading edge 67 of the air inlet wall 64, such that a gap 104 is defined between the trailing edge of the flow-guiding member and the leading edge of the air inlet wall. The bleed portion of air flowing upstream within the recirculation passage 90 is injected through this gap 104 back into the compressor air inlet. In this embodiment, the air inlet is formed by the air inlet wall 64 of the cover.

The compressor housing assembly 16 also defines a coolant inlet and a coolant outlet (not visible in FIGS. 1-5) each extending from an outer surface of the compressor housing assembly into the coolant passage 80 for circulation of a liquid coolant through the coolant inlet into the coolant passage and then from the coolant passage out through the coolant outlet. An important feature of the invention is that the axially upstream surface 54 of the diffuser-defining wall 48 is wetted and cooled by the liquid coolant circulating through the coolant passage 80. With prior-art sand-cast compressor housings it is difficult to configure a coolant passage close enough to the diffuser wall to effectively cool the wall. The present invention overcomes this difficulty by the provision of the separate cover 70 cooperating with the compressor housing 36 so as to define the coolant passage 80. The cover further defines a dividing wall or dam D (FIG. 5) that projects radially outwardly from the peripheral wall 72 to engage a radially inner surface of the compressor housing 36. The dam D serves to separate the beginning of the coolant passage 80 where coolant enters via the coolant inlet, from the end of the coolant passage where coolant exits through the coolant outlet. Thus, the dam ensures that the coolant must circulate through the entire circumferential extent of the coolant passage before exiting. In an alternative embodiment (not shown), the dam D could be formed on the compressor housing 36 instead of on the cover 70.

Figure 6:
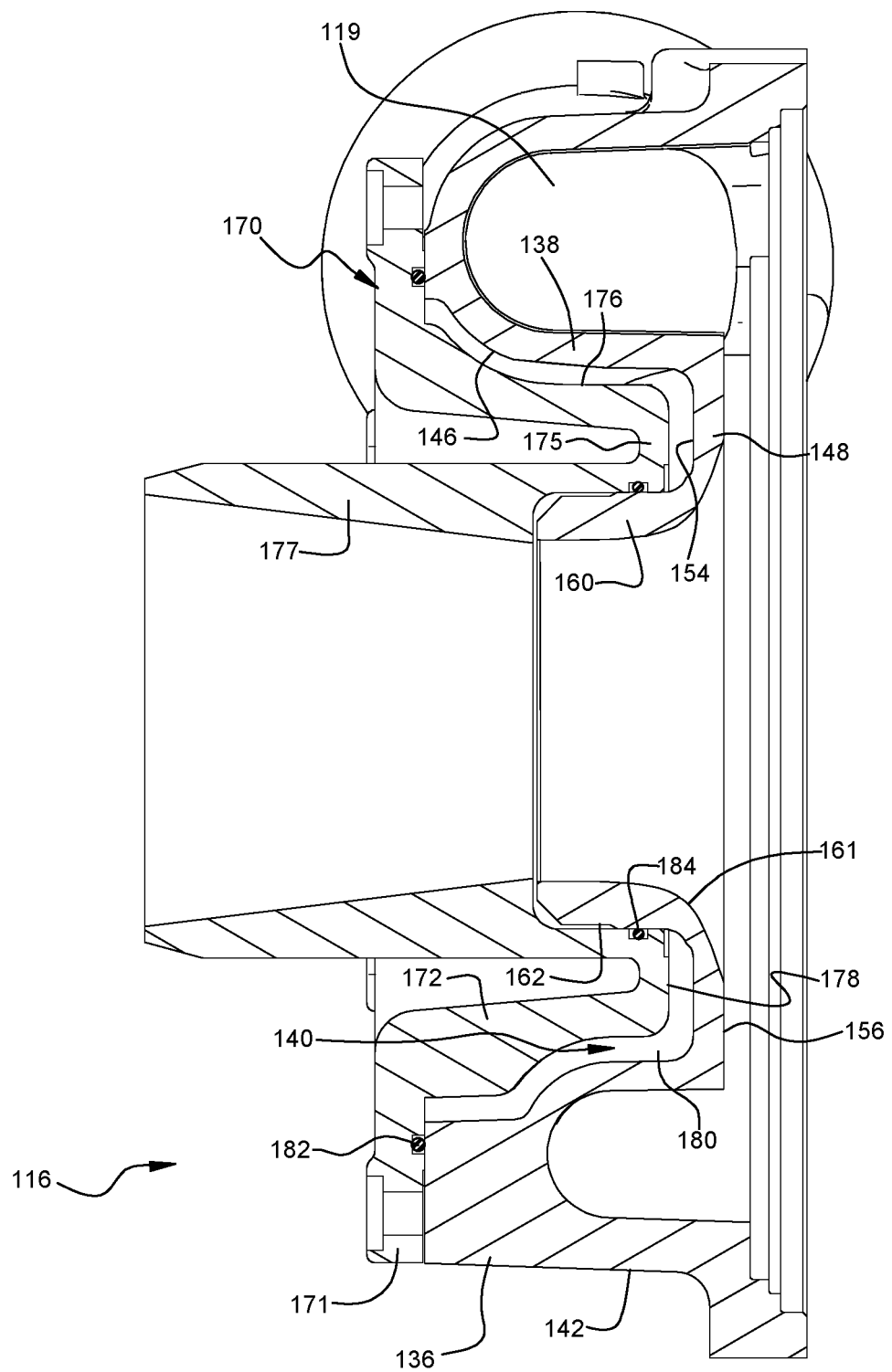
FIG. 6 illustrates a compressor housing assembly in accordance with a second, non-ported shroud embodiment of the invention.

FIG. 6 illustrates a non-ported shroud compressor housing assembly 116 in accordance with a second embodiment of the invention. The compressor housing assembly comprises a compressor housing 136 comprising a radially outer wall 138 that encircles a central longitudinal axis of the compressor housing assembly. The radially outer wall 138 defines a radially outer surface 142 that encircles the longitudinal axis and extends axially from an upstream end toward a downstream end (left to right in FIG. 6) of the compressor housing. The radially outer wall defines a radially inner surface 146 that encircles the longitudinal axis and extends axially toward the downstream end of the compressor housing. The radially outer wall 138 also defines a volute 119 that encircles the longitudinal axis.

The compressor housing 136 further comprises a diffuser-defining wall 148 integrally joined with the radially outer wall 138 contiguous with the volute 119, the diffuser-defining wall extending radially inwardly from the radially outer wall. The diffuser-defining wall comprises an axially upstream surface 154 and an axially downstream surface 156.

The compressor housing 136 also defines a wheel shroud 160 integrally joined with a radially inner end of the diffuser-defining wall 148 and extending radially inwardly and axially upstream therefrom. The wheel shroud comprises a radially inner surface that defines a contour 161 positioned to be disposed adjacent an outer periphery of the compressor wheel when the compressor wheel is housed within the compressor housing, and defines a radially outer surface 162.

Collectively, the radially inner surface 146 of the radially outer wall, the upstream surface 154 of the diffuser-defining wall, and the radially outer surface 162 of the wheel shroud define an open-ended cavity 140 that is open at its upstream end.

The compressor housing assembly 116 also includes a cover 170 formed separately from and non-integrally with the compressor housing 136. The cover comprises a peripheral wall 172 that encircles the longitudinal axis of the compressor and defines a radially outer surface 176. In this embodiment, a downstream end of the peripheral wall 172 of the cover is joined to an annular wall 175 that extends radially inwardly and is joined to a tubular inlet-defining wall 177. The annular wall 175 defines a downstream surface 178. The cover 170 is affixed to the compressor housing such that the peripheral wall 172 is received into the open-ended cavity 140 of the compressor housing 136 and thereby closes the cavity. The radially inner surface 146 of the compressor housing, the upstream surface 154 of the diffuser-defining wall, the radially outer surface 176 of the cover's peripheral wall, and the downstream surface 178 of the annular wall of the cover cooperate to form a closed coolant passage 180 therebetween. An upstream end of the cover defines a radially outwardly extending annular flange 171 that abuts an upstream end of the compressor housing 136, and fasteners or press-fitting can affix the cover to the compressor housing to retain the cover in place.

Seals 182 and 184 are disposed between respective surfaces of the compressor housing 136 and the cover 170 to seal the coolant passage 180. Specifically, the seal 182 comprises a seal ring disposed between an axially facing surface of the cover flange 171 and an opposing axially facing surface of the compressor housing 136. The seal 184 comprises a seal ring disposed between a radially inwardly facing surface of the cover 170 and the radially outer surface 162 of the wheel shroud 160. A liquid coolant can be circulated through the passage 180 to cool the compressor housing. In particular, the coolant wets the back side of the diffuser-defining wall 148 and thereby reduces the rise in temperature that would otherwise occur in the compressed air being delivered through the diffuser to the volute.

The second embodiment in FIG. 6 has the further benefit of reducing heat transfer from the material of the compressor housing to the air entering the compressor. Such heat transfer has the effect of raising the compressor inlet temperature TIC, which is deleterious to compressor performance. The embodiment in FIG. 6 achieves this benefit by virtue of the relatively low-mass inlet-forming wall 177, which is thermally isolated from the cover's peripheral wall 172 via an intervening void space in which ambient air is present. Accordingly, the effective mass that could transfer heat to the inlet air is kept relatively small, thereby reducing the heat transfer-induced elevation of TIC.

Figure 7:
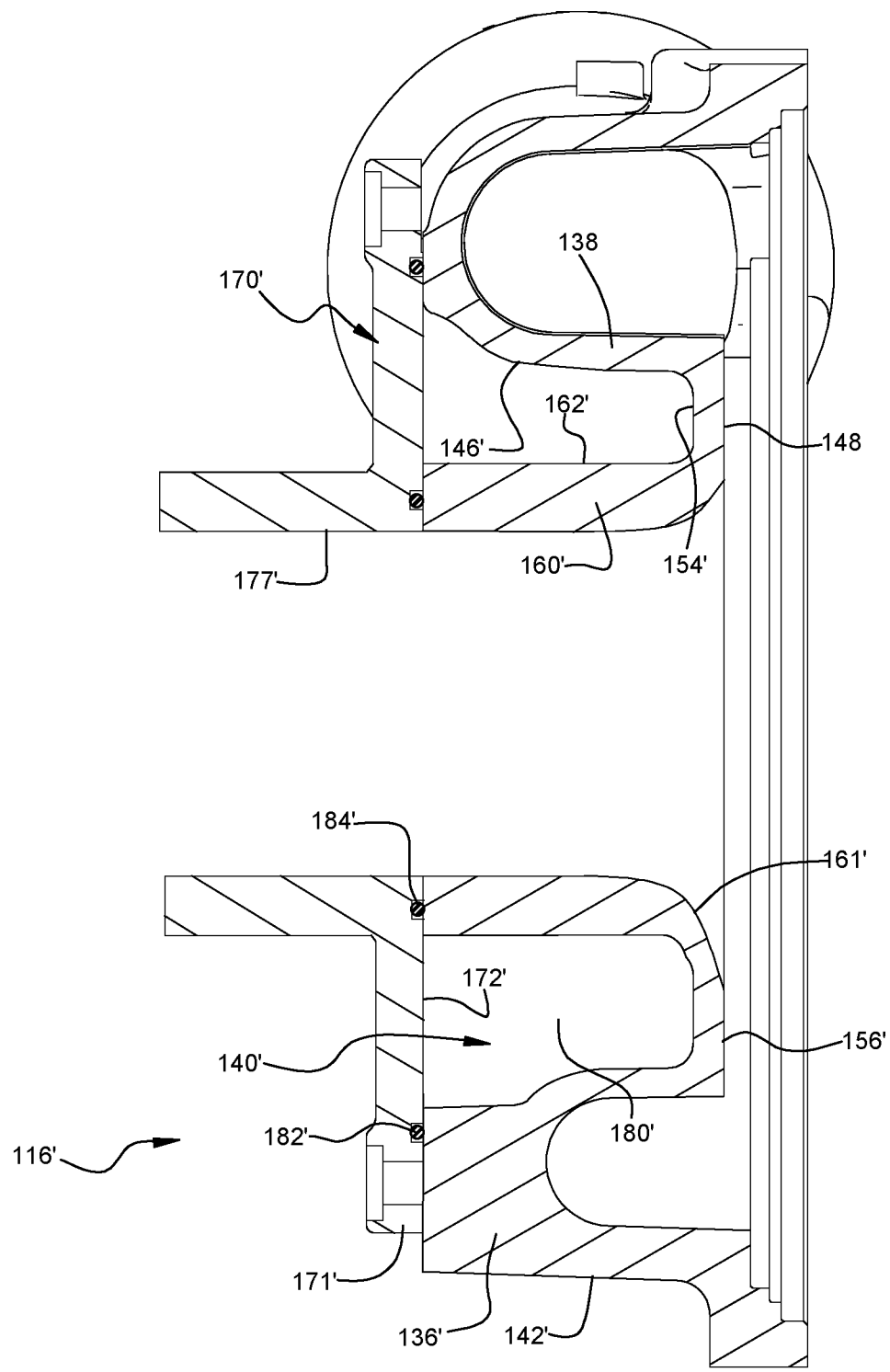
FIG. 7 shows a compressor housing assembly in accordance with a third, non-ported shroud embodiment of the invention.

FIG. 7 shows a compressor housing assembly 116' in accordance with a third embodiment of the invention, also comprising a non-ported shroud assembly. The compressor housing assembly comprises a compressor housing 136' comprising a radially outer wall 138'. The radially outer wall 138' defines a radially outer surface 142' that encircles the longitudinal axis and extends axially from an upstream end toward a downstream end (left to right in FIG. 7) of the compressor housing. The radially outer wall also defines a radially inner surface 146' that encircles the longitudinal axis and extends axially toward the downstream end of the compressor housing. The surface 146' is a coolant passage-defining surface, as further described below.

The compressor housing 136' further comprises a diffuser-defining wall 148' integrally joined with the radially outer wall 138' at a location proximate the downstream end thereof, the diffuser-defining wall extending radially inwardly from the radially outer wall. An axially upstream surface of the diffuser-defining wall comprises a second coolant passage-defining surface 154' and an axially downstream surface of the diffuser-defining wall comprises a diffuser-defining surface 156'.

The compressor housing 136' also defines a wheel shroud 160' integrally joined with a radially inner end of the diffuser-defining wall 148' and extending axially upstream therefrom. The wheel shroud comprises a radially inner surface that defines a contour 161' positioned to be disposed adjacent an outer periphery of the compressor wheel when the compressor wheel is housed within the compressor housing. A radially outer surface of the wheel shroud defines a third coolant passage-defining surface 162'.

The compressor housing assembly 116' further comprises a cover 170' formed separately from and non-integrally with the compressor housing 136'. The cover comprises a tubular inlet-defining wall 177' joined to an annular flange or plate 171' that extends radially outwardly from a downstream end of the inlet-defining wall. The cover is fastened to the compressor housing via any suitable fastening device(s) such that the cover closes the open-ended cavity 140' formed by the coolant passage-defining surfaces 146', 154', and 162'. The inlet-defining wall is structured and arranged to mate with the wheel shroud 160'. An axially facing downstream surface of the cover comprises a fourth coolant passage-defining surface 172'. The four coolant passage-defining surfaces collectively form a coolant passage 180' through which a liquid coolant is circulated to cool the compressor housing. Seals 182' and 184' are disposed between the annular flange 171' and opposing surfaces of the compressor housing 136' to seal the coolant passage. While the cover 170' is shown and described as having the tubular inlet-defining wall in this embodiment, in other (non-illustrated)

embodiments, the inlet-defining wall can be omitted such that the cover comprises an annular plate to close the cavity in the compressor housing.

Figure 8:
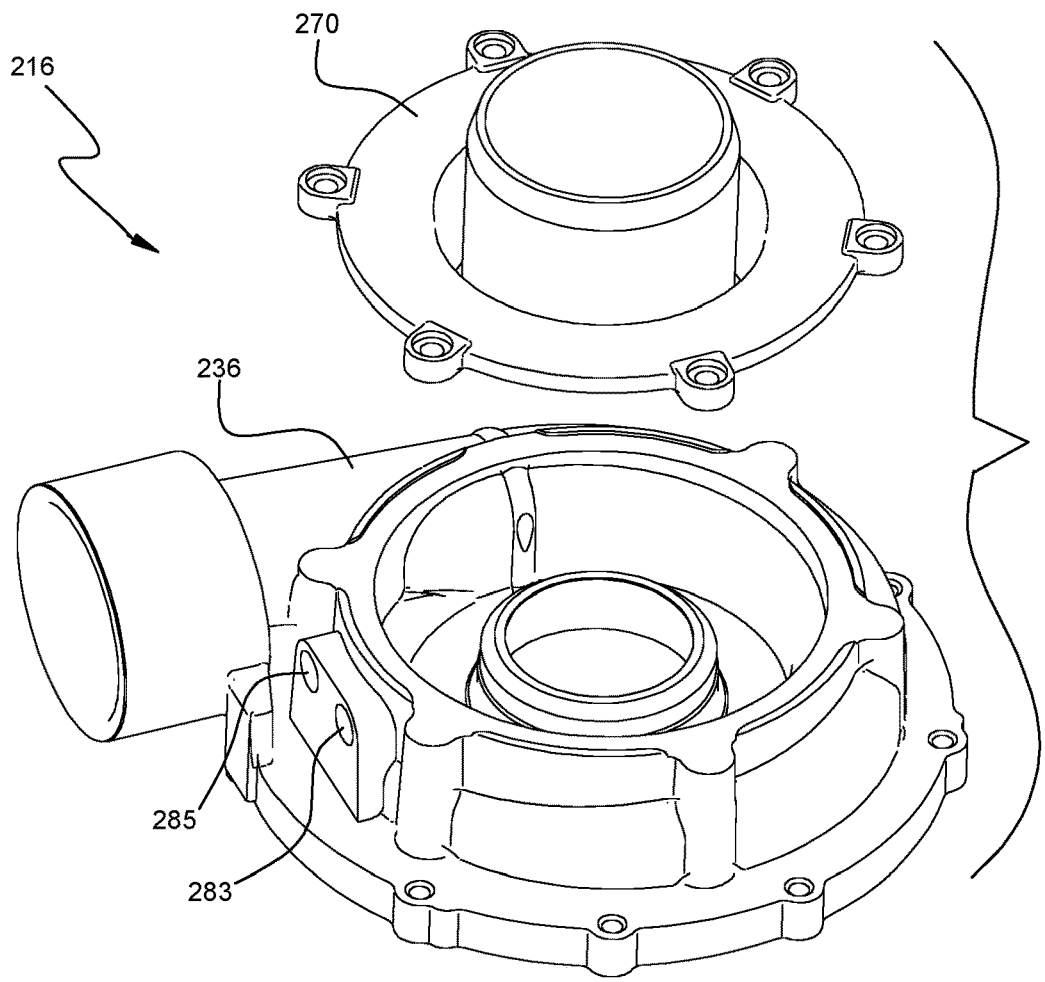
FIG. 8 is an exploded view of a compressor housing assembly in accordance with a fourth embodiment of the invention, in which the coolant inlet and the coolant outlet are defined by the compressor housing and are located circumferentially adjacent each other.
Figure 8A:
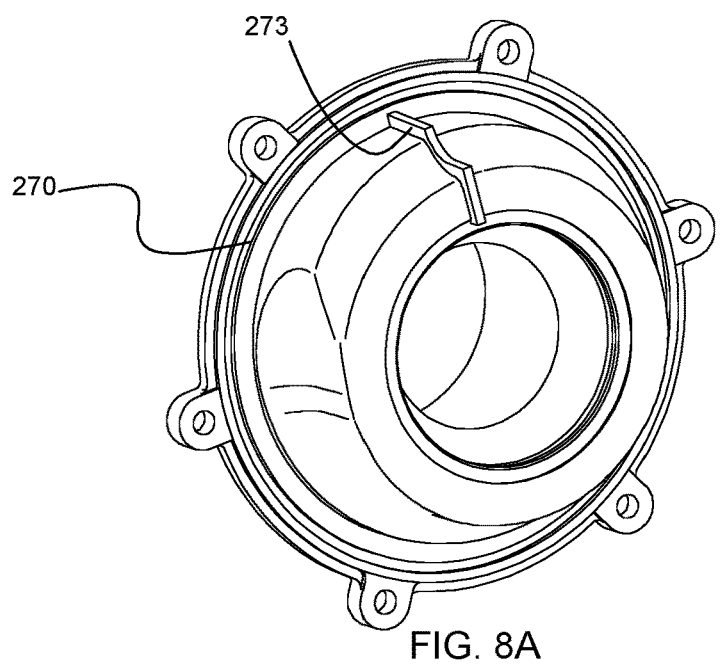
FIG. 8A is an isometric view of the cover of the fourth embodiment, viewed toward a downstream side of the cover.
Figure 9:
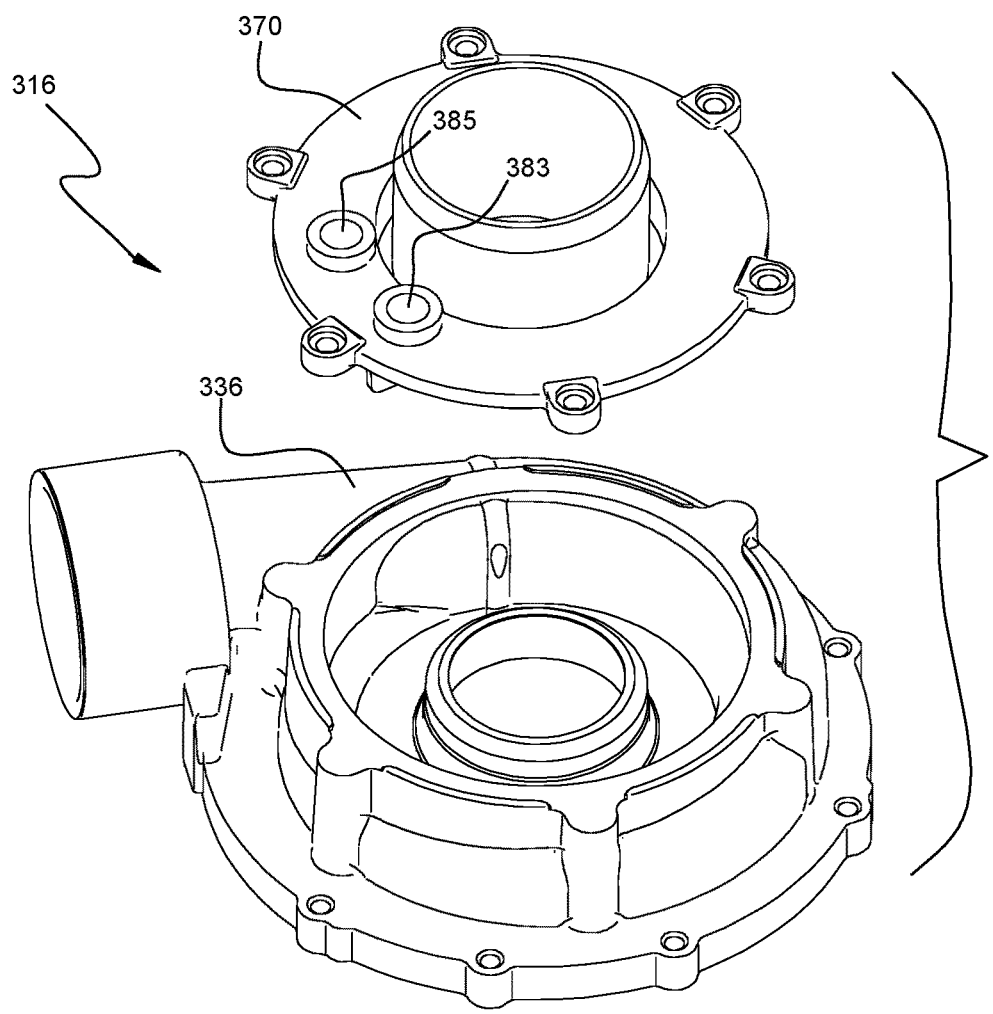
FIG. 9 is an exploded view of a compressor housing assembly in accordance with a fifth embodiment of the invention, in which the coolant inlet and the coolant outlet are defined by the cover and are located circumferentially adjacent each other.
Figure 10:
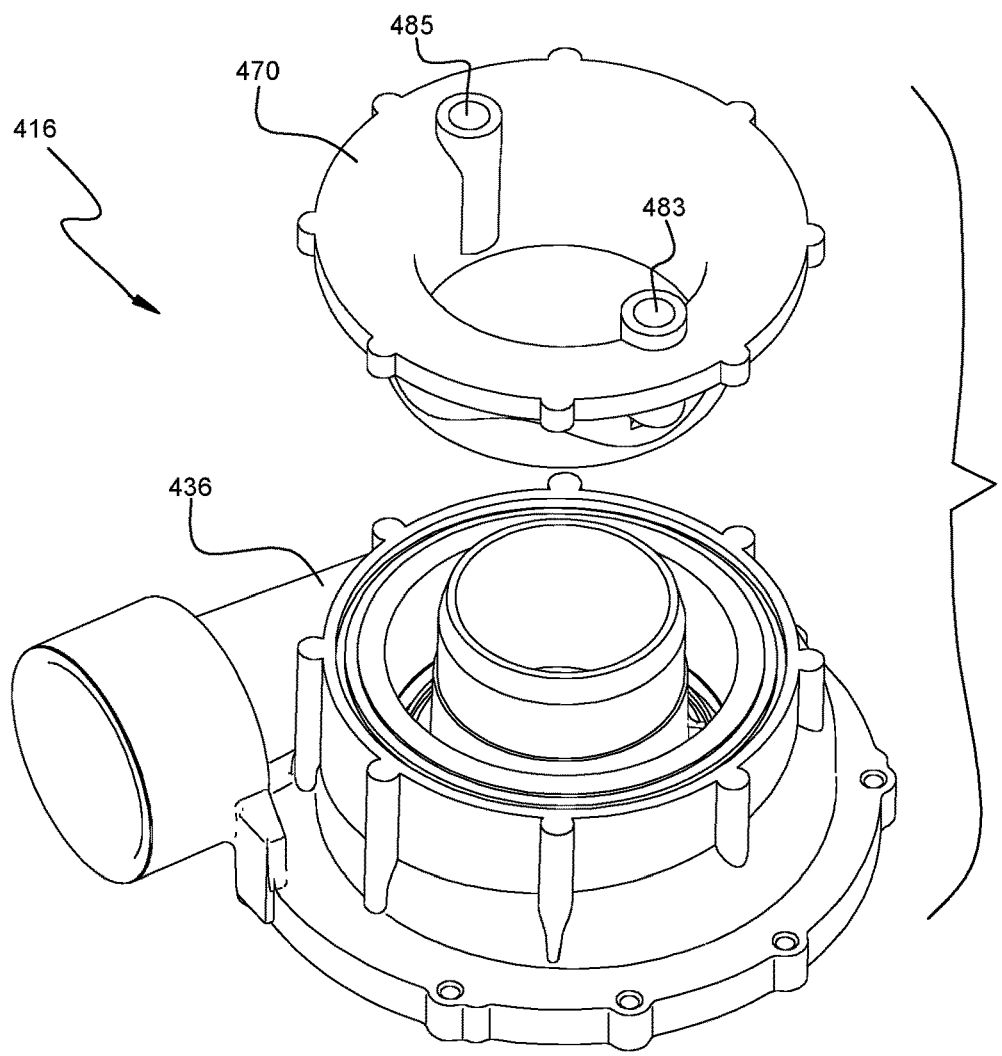
FIG. 10 is an exploded view of a compressor housing assembly in accordance with a sixth embodiment of the invention, in which the coolant inlet and the coolant outlet are defined by the cover and are located diametrically opposite each other.
Figure 10A:
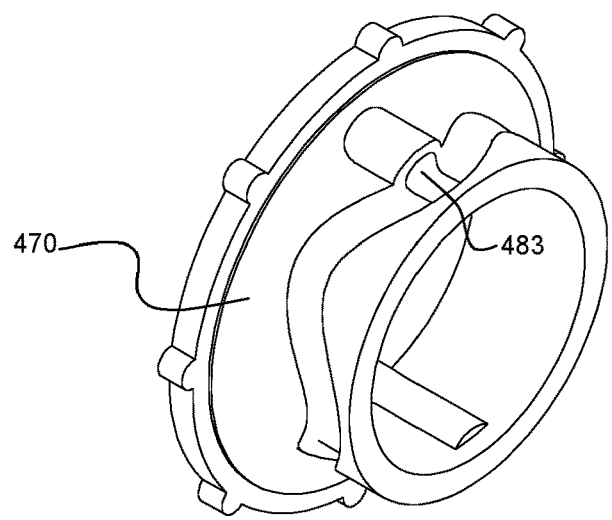
FIG. 10A is an isometric view of the cover of the sixth embodiment, viewed toward a downstream side of the cover.

FIGS. 8 through 10 illustrate various configurations of coolant inlet and coolant outlet features for feeding liquid coolant into the coolant passage of the compressor housing assembly and discharging coolant out from the passage after the coolant has circulated through the passage. FIG. 8 is an exploded view of a compressor housing assembly 216 in accordance with a fourth embodiment of the invention. The assembly comprises a compressor housing 236 and a separate cover 270 that cooperate to form a coolant passage (not shown) within the compressor housing assembly generally as in the previously described embodiments. The compressor housing 236 defines a coolant inlet 283 for leading liquid coolant into the coolant passage, and a coolant outlet 285 for discharging the coolant from the passage. In the third embodiment, the coolant inlet and coolant outlet are located circumferentially proximate each other. The cover 270 defines a dividing wall 273 (FIG. 8A) projecting from the side of the cover that faces toward the compressor wheel. The dividing wall is located circumferentially between the coolant inlet 283 and the coolant outlet 285. The free edge of the dividing wall contacts opposing surfaces of the compressor housing such that the dividing wall divides the coolant passage in between the coolant inlet and outlet. Accordingly, coolant entering the coolant inlet must flow around nearly the full circumference of the coolant passage before it can exit through the coolant outlet.

Figure 9A:
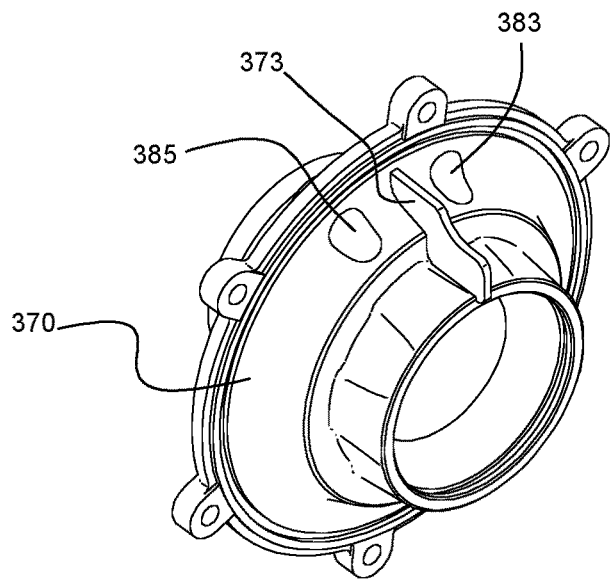
FIG. 9A is an isometric view of the cover of the fifth embodiment, viewed toward a downstream side of the cover.

FIG. 9 is an exploded view of a compressor housing assembly 316 in accordance with a fifth embodiment of the invention. The assembly comprises a compressor housing 336 and a separate cover 370 that cooperate to form a coolant passage (not shown) within the compressor housing assembly generally as in the previously described embodiments. In this embodiment, the cover 370 defines a coolant inlet 383 for leading liquid coolant into the coolant passage, and a coolant outlet 385 for discharging the coolant from the passage. The coolant inlet and coolant outlet are located circumferentially proximate each other. The cover 370 defines a dividing wall 373 (FIG. 9A) projecting from the side of the cover that faces toward the compressor wheel. The dividing wall is located circumferentially between the coolant inlet 383 and the coolant outlet 385. The free edge of the dividing wall contacts opposing surfaces of the compressor housing such that the dividing wall divides the coolant passage in between the coolant inlet and outlet. Accordingly, coolant entering the coolant inlet must flow completely around the coolant passage before it can exit through the coolant outlet.

FIG. 10 is an exploded view of a compressor housing assembly 416 in accordance with a sixth embodiment of the invention. The assembly comprises a compressor housing 436 and a separate cover 470 that cooperate to form a coolant passage (not shown) within the compressor housing assembly generally as in the previously described embodiments. In this embodiment, the cover 470 defines a coolant inlet 483 for leading liquid coolant into the coolant passage, and a coolant outlet 485 for discharging the coolant from the passage. The coolant inlet and coolant outlet are located diametrically opposite each other. Coolant entering the coolant inlet splits into one portion that proceeds clockwise and a second portion that proceeds counterclockwise, the two portions then rejoining and exiting through the coolant outlet.

The covers in accordance with embodiments of the invention as described herein can be manufactured from either metal or plastic, using any of various manufacturing processes. For example, metal covers can be made by sand casting or die casting. Plastic covers can be made by injection molding.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A liquid-cooled compressor housing assembly, comprising:
   a compressor housing comprising a wheel shroud that defines a contour, a diffuser-defining wall joined integrally with the wheel shroud and extending radially outwardly therefrom, and a radially outer wall joined integrally with a radially outermost extent of the diffuser-defining wall, the radially outer wall defining a volute contiguous with the diffuser-defining wall, wherein the wheel shroud, the diffuser-defining wall, and the radially outer wall collectively bound an open-ended cavity that extends into the compressor housing along an axially downstream direction, an upstream end of the cavity being open; and
   a cover formed as a separate structure from the compressor housing, the cover being affixed to the compressor housing by one or more fastening devices such that the cover closes the open upstream end of the cavity, whereby a coolant passage is defined between and bounded by the cover and the cavity in the compressor housing, wherein:
   the coolant passage is bounded in part by an axially upstream surface of the diffuser-defining wall, whereby when coolant is circulated through the coolant passage, the diffuser-defining wall is wetted and cooled by the coolant;
   the coolant passage is bounded in part by a radially inner surface of the radially outer wall of the compressor housing;
   the cover includes a peripheral wall encircling a longitudinal axis of the compressor housing assembly, the peripheral wall being received into the cavity in the compressor housing such that the coolant passage is bounded in part by a radially outer surface of the peripheral wall, the peripheral wall defining a radially inner surface comprising an air-guiding surface in use;
   seals are disposed between respective surfaces of the compressor housing and the cover to seal the coolant passage; and
   a coolant inlet and a coolant outlet each extend from an outer surface of the compressor housing assembly into the coolant passage for circulation of a liquid coolant through the coolant inlet into the coolant passage and then from the coolant passage out through the coolant outlet.

2. The liquid-cooled centrifugal compressor housing assembly of claim 1, wherein the cover includes an integrally joined air inlet wall that is spaced radially inwardly from the peripheral wall of the cover, the air inlet wall comprising a radially outer surface that is spaced radially inwardly from the radially inner air-guiding surface of the peripheral wall of the cover so as to define a recirculation passage therebetween, and wherein a bleed port is defined between an upstream end of the wheel shroud and a downstream end of the air inlet wall, the bleed port extending into the recirculation passage.

3. The liquid-cooled centrifugal compressor housing assembly of claim 2, further comprising a flow-guiding member affixed within the cover, the flow-guiding member comprising an annular member that extends from the peripheral wall of the cover radially inwardly and axially downstream to a trailing edge of the flow-guiding member, the trailing edge of the flow-guiding member being proximate to but spaced from a leading edge of the air inlet wall, such that a gap is defined between the trailing edge of the flow-guiding member and the leading edge of the air inlet wall.

4. The liquid-cooled centrifugal compressor housing assembly of claim 1, wherein the seals comprise a first seal ring disposed between the radially inner surface of the radially outer wall of the compressor housing and the radially outer surface of the peripheral wall of the cover to seal the coolant passage at an upstream end thereof, and a second seal ring disposed between the radially inner surface of the peripheral wall of the cover and the radially outer surface of the wheel shroud to seal the coolant passage at a downstream end thereof.

5. A turbocharger, comprising:
the compressor housing assembly of claim 1;
a compressor wheel disposed within the compressor housing;
a turbine housing and a turbine wheel disposed within the turbine housing;
a rotatable shaft, the compressor wheel being affixed to one end of the shaft and the turbine wheel being affixed to an opposite end of the shaft; and
a center housing disposed between the compressor housing and the turbine housing, wherein bearings supporting the shaft are housed within the center housing.

6. The turbocharger of claim 5, wherein the cover includes an integrally joined air inlet wall that is spaced radially inwardly from the peripheral wall of the cover, the air inlet wall comprising a radially outer surface that is spaced radially inwardly from the radially inner air-guiding surface of the peripheral wall of the cover so as to define a recirculation passage therebetween, and wherein a bleed port is defined between an upstream end of the wheel shroud and a downstream end of the air inlet wall, the bleed port extending into the recirculation passage.

7. The turbocharger of claim 6, further comprising a flow-guiding member affixed within the cover, the flow-guiding member comprising an annular member that extends from the peripheral wall of the cover radially inwardly and axially downstream to a trailing edge of the flow-guiding member, the trailing edge of the flow-guiding member being proximate to but spaced from a leading edge of the air inlet wall, such that a gap is defined between the trailing edge of the flow-guiding member and the leading edge of the air inlet wall.

8. The turbocharger of claim 5, wherein the seals comprise a first seal ring disposed between the radially inner surface of the radially outer wall of the compressor housing and the radially outer surface of the peripheral wall of the cover to seal the coolant passage at an upstream end thereof, and a second seal ring disposed between the radially inner surface of the peripheral wall of the cover and the radially outer surface of the wheel shroud to seal the coolant passage at a downstream end thereof.

9. The turbocharger of claim 5, wherein a diffuser for the compressor is formed between an axially downstream surface of the diffuser-defining wall of the compressor housing and an axially upstream surface of the center housing.

* * * * *